(12) United States Patent
Badjatiya et al.

(10) Patent No.: US 12,106,603 B2
(45) Date of Patent: Oct. 1, 2024

(54) DYNAMIC NON-LINEAR INTERPOLATION OF LATENT VECTORS FOR SEMANTIC FACE EDITING

(71) Applicant: ADOBE INC., San Jose, CA (US)

(72) Inventors: Pinkesh Badjatiya, Madhya Pradesh (IN); Parth Patel, Gujarat (IN)

(73) Assignee: ADOBE INC., San Jose, CA (US)

( * ) Notice: Subject to any disclaimer, the term of this patent is extended or adjusted under 35 U.S.C. 154(b) by 362 days.

(21) Appl. No.: 17/454,645

(22) Filed: Nov. 12, 2021

(65) Prior Publication Data

US 2023/0154232 A1    May 18, 2023

(51) Int. Cl.
| | |
|---|---|
| G06K 9/00 | (2022.01) |
| G06F 3/04847 | (2022.01) |
| G06T 11/60 | (2006.01) |
| G06V 40/16 | (2022.01) |
| G06N 3/02 | (2006.01) |

(52) U.S. Cl.
CPC ........ G06V 40/161 (2022.01); G06F 3/04847 (2013.01); G06T 11/60 (2013.01); G06V 40/168 (2022.01); G06N 3/02 (2013.01); G06T 2200/24 (2013.01)

(58) Field of Classification Search
CPC ....... G06T 11/60; G06T 5/77; G06T 2215/16; G06T 15/04; G06T 15/20; G06T 3/4038; G06T 11/00; G06T 11/001; G06T 15/506; G06V 10/16; G06V 10/24; G06V 10/141; G06V 10/56; G06V 10/761; G06V 20/64; G06V 20/693; G06V 10/26; G06V 10/762; G06V 10/763
See application file for complete search history.

(56) References Cited

U.S. PATENT DOCUMENTS

| | | | | |
|---|---|---|---|---|
| 7,567,256 B2 * | 7/2009 | Hollowbush | .......... | H04N 17/02 |
| | | | | 715/792 |
| 2008/0238942 A1 * | 10/2008 | Sun | .......... | G06T 5/77 |
| | | | | 345/634 |
| 2013/0326434 A1 * | 12/2013 | Feng | .......... | G03F 1/70 |
| | | | | 716/52 |

OTHER PUBLICATIONS

1Shen, et al., "Interpreting the Latent Space of GANs for Semantic Face Editing", In CVPR, 2020, pp. 9243-9252.
2Karras, et al., "Analyzing and Improving the Image Quality of StyleGAN", In CVPR 2020, pp. 8110-8119.

(Continued)

*Primary Examiner* — Alex Kok S Liew
(74) *Attorney, Agent, or Firm* — F. CHAU & ASSOCIATES, LLC

(57) ABSTRACT

Systems and methods for image processing are described. One or more embodiments of the method, apparatus, non-transitory computer readable medium, and system include identifying an encoding of an image, an attribute to be modified in the image, and a plurality of attributes to be preserved in the image; generating a non-linear interpolation for the encoding by iteratively identifying a sequence of boundary vectors, wherein each boundary vector of the sequence of boundary vectors is based on selecting a plurality of conditional boundary vectors representing a subset of the plurality of attributes to be preserved at each corresponding iteration; and generating a modified image based on the image encoding and the non-linear interpolation, wherein the modified image corresponds to the image with the attribute to be modified.

17 Claims, 9 Drawing Sheets

(56) References Cited

OTHER PUBLICATIONS

3Patel, et al., LT-GAN: Self-Supervised GAN with Latent Transformation Detection, In WACV, arXiv preprint arXiv:2010.09893v1 [cs.CV] Oct. 19, 2020, 15 pages.
4Karras, et al., "A Style-Based Generator Architecture for Generative Adversarial Networks", In CVPR, arXiv preprint arXiv:1812.04948v3 [cs.NE] Mar. 29, 2019, 12 pages.
5Wu, et al., "StyleSpace Analysis: Disentangled Controls for StyleGAN Image Generation", In CVPR 2021, pp. 12863-12872.

* cited by examiner

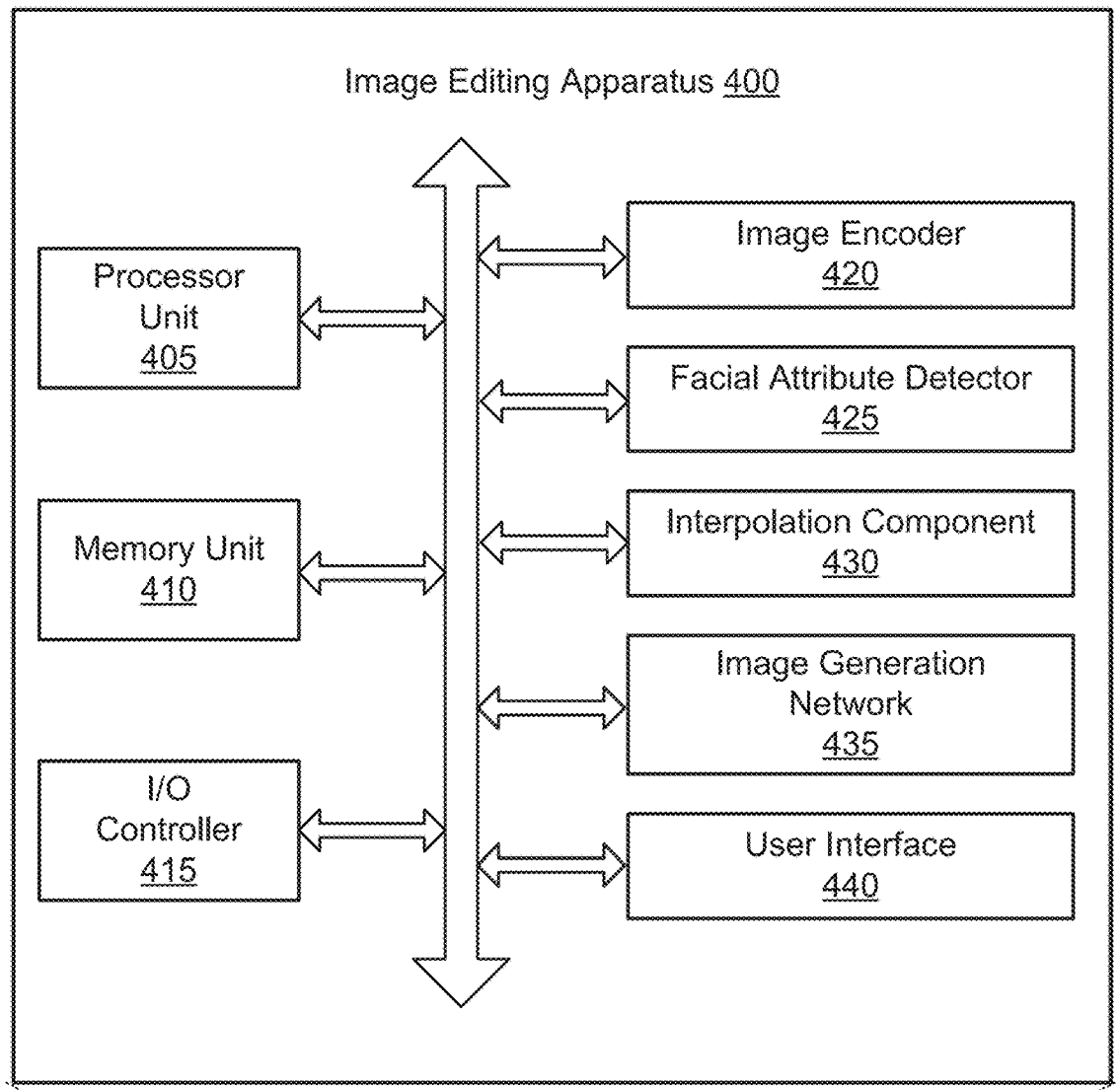
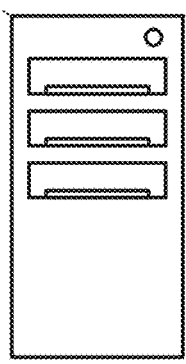
FIG. 4

Algorithm: Dynamic Non-Linear Interpolation

Inputs:
1. $G$: Generator network
2. $z$: Latent code
3. $b_0$: Primal boundary
4. $[b_1, b_2, ..., b_N]$: $N$ conditional boundaries
5. $\Delta$: Step size of interpolation
6. $n$: Number of steps in the interpolation
7. $F$: Facial attribute detector network

Sub-Procedure 1: Computes scores of the $N$ conditional attributes for $img$ using $F$:
1. $\boldsymbol{predict\_attributes(F, img)}$ :
2.     return $F(img)$

Sub-Procedure 2: Returns which two conditional attributes' scores have changed most between the previous and current steps of the interpolation:
1. $\boldsymbol{get\_max\_diff\_conditional\_attributes(attribute_{predictions})}$ :
2.     $prev_{predictions} = attribute_{predictions}[-2]$ # second last element of list
3.     $curr_{predictions} = attribute_{predictions}[-1]$ # last element of list
4.     $diff_{predictions} = []$
5.     for $i$ in range$(1, N)$:
6.         $diff_{predictions}.append((i, abs(prev_{predictions}[i] - curr_{predictions}[i])))$
7.     $diff_{predictions}.sort(key = lambda\ x : x[1], reverse = True)$
8.     return $(diff_{predictions}[0][0], diff_{predictions}[1][0])$

Procedure:
1. $original_{img} = G(z)$
2. $interpolation_{list} = [original_{img}]$
3. $attribute_{predictions} = [predict\_attributes(F, original_{img})]$
4. $b = b_0$
5. for step in range$(1, n)$:
6.     $img = G(z + \Delta * b)$
7.     $attribute_{predictions}.append(predict\_attributes(F, img))$
8.     $(i, j) = get\_max\_diff\_conditional\_attributes(attribute_{predictions})$
9.     $attribute_{predictions}.pop()$
10.    $b = project\_boundary(b, [b_i, b_j])$
11.    $z = z + \Delta * b$
12.    $img = G(z)$
13.    $interpolation_{list}.append(img)$
14.    $attribute_{predictions}.append(predict\_attributes(F, img))$
15. return $interpolation_{list}$

FIG. 8

DYNAMIC NON-LINEAR INTERPOLATION OF LATENT VECTORS FOR SEMANTIC FACE EDITING

BACKGROUND

The following relates generally to image processing, and more specifically to processing facial images.

Digital image processing refers to the use of a computer to edit a digital image using an algorithm or a processing network. In some examples, an image may be processed using image editing software. Image editing software are commonly used to edit images of people. For example, image editing may be performed to increase the general appeal of an image. In some cases, image editing is done to modify an image based on user request.

Image processing may include tasks such as editing facial attributes. For example, an image of a person's face may be modified to show a change in age or hair color. Some image editing techniques use a machine learning framework for changing image attributes. For example, a machine learning model may represent an image as a vector in a latent vector space, and then edit the vector before decoding the edited vector to obtain an edited image.

However, when a latent vector is modified, multiple attributes can be altered, including attributes or elements that the user wanted to remain constant. Conventional image editing systems are unable to alter a single attribute while preserving more than two attributes unchanged. Therefore, there is a need in the art for improved image processing systems that change desired image attributes while preserving other attributes.

SUMMARY

The present disclosure describes systems and methods for image processing. Embodiments of the present disclosure include an image processing apparatus configured to generate a modified image of a face in which one attribute is altered while other attributes are preserved. In some cases, a dynamic non-linear interpolation technique is used for semantic face editing using a generative machine learning model (e.g., a generative adversarial network, or GAN). In some embodiments, a boundary vector is identified at each step of an iterative interpolation using feedback from a facial attribute detector to identify appropriate navigation directions within a latent space.

A method, apparatus, non-transitory computer readable medium, and system for image processing are described. One or more embodiments of the method, apparatus, non-transitory computer readable medium, and system include identifying an encoding of an image, an attribute to be modified in the image, and a plurality of attributes to be preserved in the image; generating a non-linear interpolation for the encoding by iteratively identifying a sequence of boundary vectors, wherein each boundary vector of the sequence of boundary vectors is based on selecting a plurality of conditional boundary vectors representing a subset of the plurality of attributes to be preserved at each corresponding iteration; and generating a modified image based on the image encoding and the non-linear interpolation, wherein the modified image corresponds to the image with the attribute to be modified.

A method, apparatus, non-transitory computer readable medium, and system for image processing are described. One or more embodiments of the method, apparatus, non-transitory computer readable medium, and system include identifying an encoding of an image, an attribute to be modified in the image, and a plurality of attributes to be preserved in the image; generating a first boundary vector based on a first primal boundary vector representing the attribute to be modified in the image and a plurality of first conditional boundary vectors representing first attributes to be preserved in the image; updating the encoding of the image based on the first boundary vector to obtain a first modified encoding; generating a second boundary vector based on the first boundary vector and a plurality of second conditional boundary vectors representing second attributes to be preserved in the image, wherein the second attributes are different from the first attributes; updating the first modified encoding based on the second boundary vector to obtain a second modified encoding; and generating a modified image based on the second modified encoding, wherein the modified image corresponds to the image with the attribute to be modified.

An apparatus, system, and method for image processing are described. One or more embodiments of the apparatus, system, and method include a facial attribute detector configured to generate attribute values of an image based on an encoding of the image; an interpolation component configured to iteratively generate a boundary vector for modifying the encoding of the image based on a plurality of conditional boundary vectors representing attributes to be preserved in the image; and an image generation network configured to generate a modified image based on the encoding of the image and the iteratively generated boundary vectors.

BRIEF DESCRIPTION OF THE DRAWINGS

FIG. 4 shows an example of an image editing apparatus according to aspects of the present disclosure.

FIG. 8 shows an example of dynamic non-linear interpolation algorithm according to aspects of the present disclosure.

DETAILED DESCRIPTION

Figure 1:
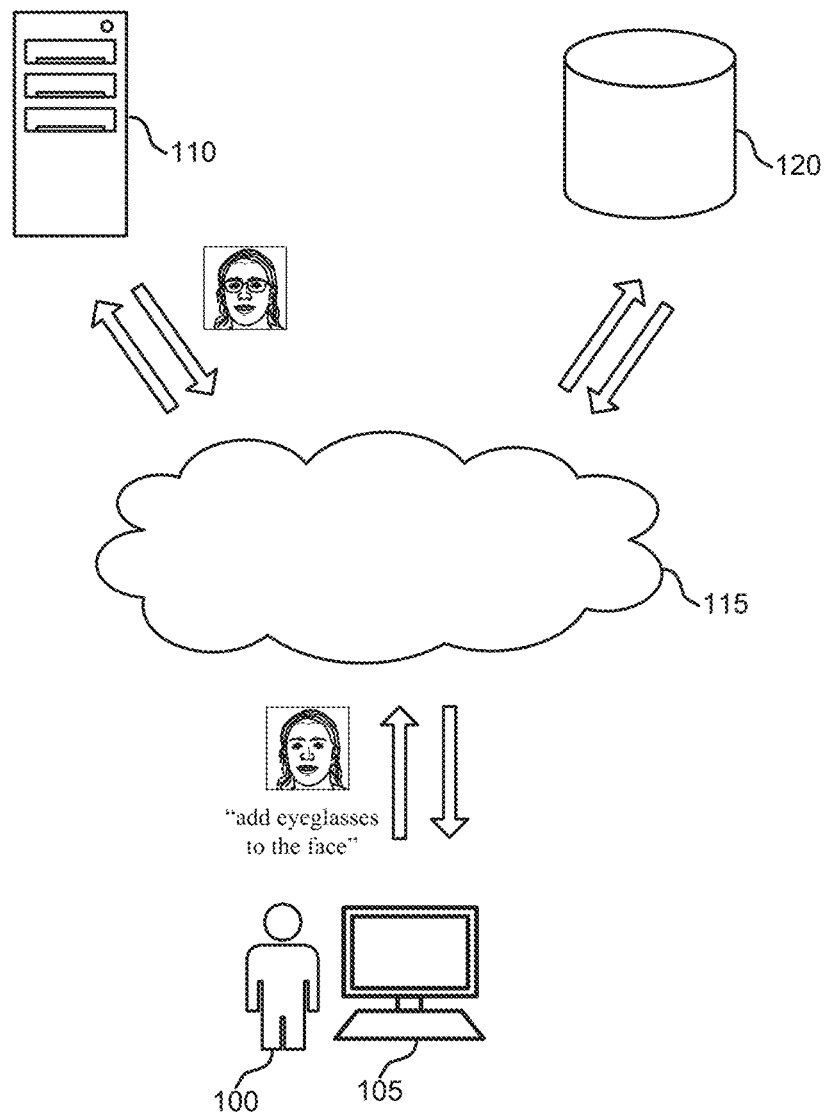
FIG. 1 shows an example of a face editing system according to aspects of the present disclosure.

The present disclosure describes systems and methods for image processing. Embodiments of the present disclosure include an image processing apparatus configured to generate a modified image of a face in which one attribute is altered while other attributes are preserved. In some cases, a dynamic non-linear interpolation technique is used for semantic face editing using a generative machine learning model (e.g., a generative adversarial network, or GAN). In some embodiments, a boundary vector is identified at each step of an iterative interpolation using feedback from a facial attribute detector to identify appropriate navigation directions within a latent space. By using multiple iterations with different boundary vectors, embodiments of the present disclosure provide non-linear navigation through the linear latent space. This enables enhanced image interpolations that change one attribute at a time while keeping multiple other conditional attributes constant.

Image editing systems can be used to modify images based on user-specified attributes. For example, a GAN can be used to generate images based on a vector of attributes in a latent space. In some cases, a linear interpolation-based framework is used to find interpretable semantics encoded in the latent space of face synthesis GAN models. For example, a boundary plane in the latent space can be identified for each attribute where changes in the latent space that are tangent to the plane preserve the associated attribute. Similarly, a boundary vector can be identified that alters the desired attribute (e.g., a vector perpendicular to the boundary plane). However, the boundary vectors for different attributes are not perpendicular, so shifting a vector in the direction of one boundary vector is likely to change several attributes of the image at once.

Conventional linear interpolation algorithms solve a system of linear equations with a maximum of two conditional attributes. Preserving more than two attributes depends on solving a system of N linear equations in N variables that may not have a solution. As a result, conventional algorithms provide a linear change in latent space that attempts to adjust one attribute while preserving just two other attributes. However, this can result in multiple undesired changes. That is, all attributes except the two selected conditional attributes can potentially be altered.

In one example, a user wants to increase the age of a person in an image, while retaining other attributes such as hair style, the presence of glasses, etc. A conventional face editing algorithm might select the hairstyle and glasses as conditional attributes to preserve during the transition. However, this might result in a change to the expression of the face during the process of adjusting the age. Since the user desired a change of age with no change in eyeglasses, and face expression (i.e., more than two conditional attributes), the modified image generated may not meet user expectations.

Embodiments of the present disclosure include an image editing system based on an iterative non-linear interpolation algorithm. Some embodiments change an image attribute while preserving multiple other attributes by selecting different conditional attributes at each step of the iteration. Feedback from a facial attribute detector can be used to identify the appropriate navigation direction at each step. For example, the facial attribute detector can determine which attributes will be altered the most at a particular step, and select those as the conditional attributes for that step. As a result, embodiments of the present disclosure can modify a specified attribute of an image while preserving an unlimited number of other image attributes.

By using dynamic non-linear interpolation, embodiments of the present disclosure perform image manipulation with more than two conditional attributes. Accordingly, the dimensionality of the matrix solution at each step is reduced, and a solution is ensured. In some examples, a facial attribute detector identifies attributes to be conditioned while navigating the GAN latent space. This can reduce the dimensionality of the system of equations used to select the iterative boundary vector, which reduces the computational complexity of the process.

Furthermore, obtaining labelled data may be expensive and difficult to scale for consumption in deep learning models. Therefore, embodiments of the present disclosure can be used to generate training data for deep learning models. For example, an interpolation algorithm may be used in areas of unsupervised deep generative models for developing deep learning-based solutions. In some examples, the deep learning-based solutions may model high dimensional data distribution. The dynamic non-linear interpolation method provides for controlled image generation and interpretable image editing using GANs, and may be used for systematic data synthesis using GANs. Thus, increasing the efficiency of neural networks by automating the generation of large sets of training data can be beneficial.

Figure 2:
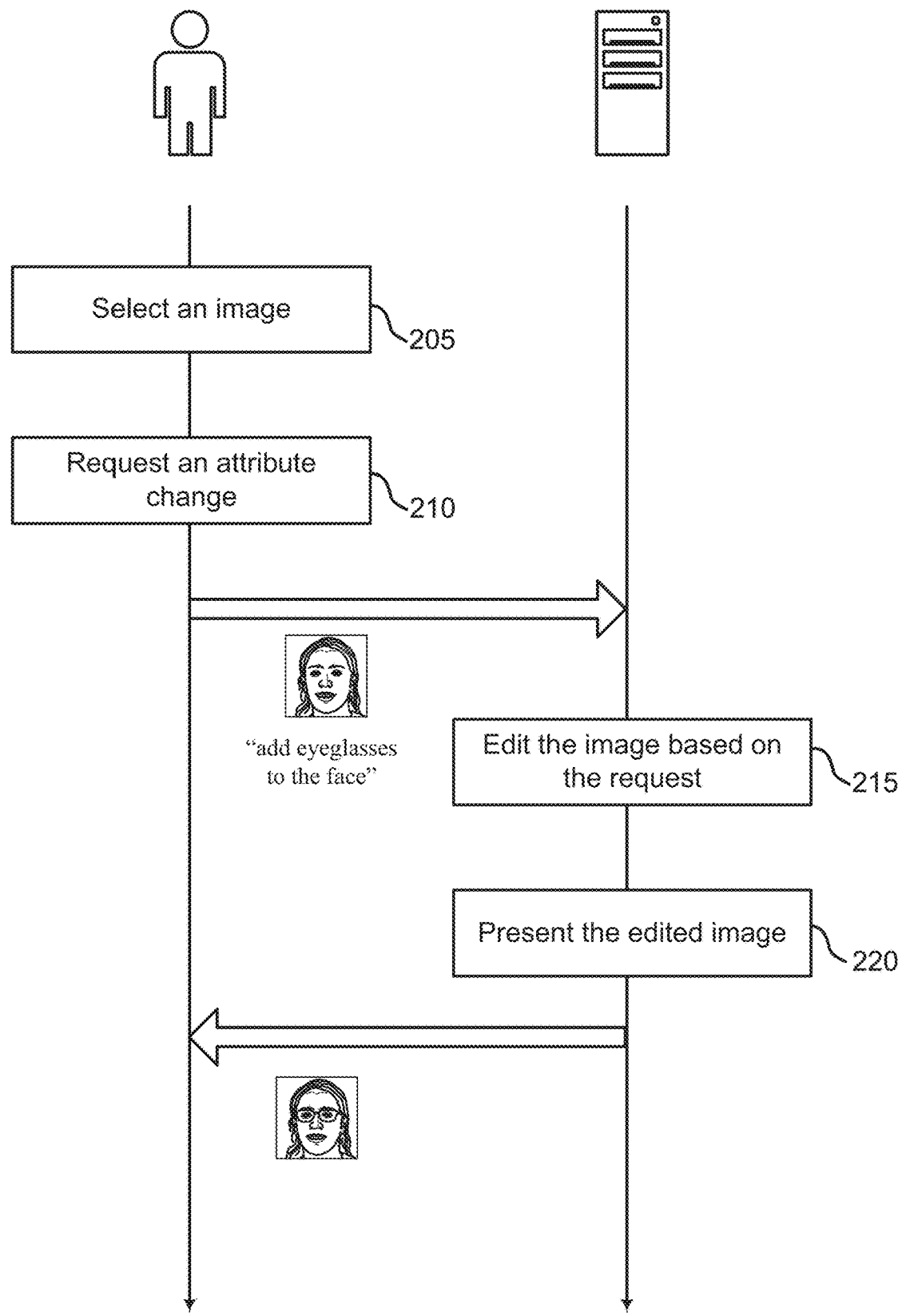
FIG. 2 shows an example of editing a face according to aspects of the present disclosure.
Figure 3:
FIG. 3 shows an example of changing a face attribute according to aspects of the present disclosure.
Figure 5:
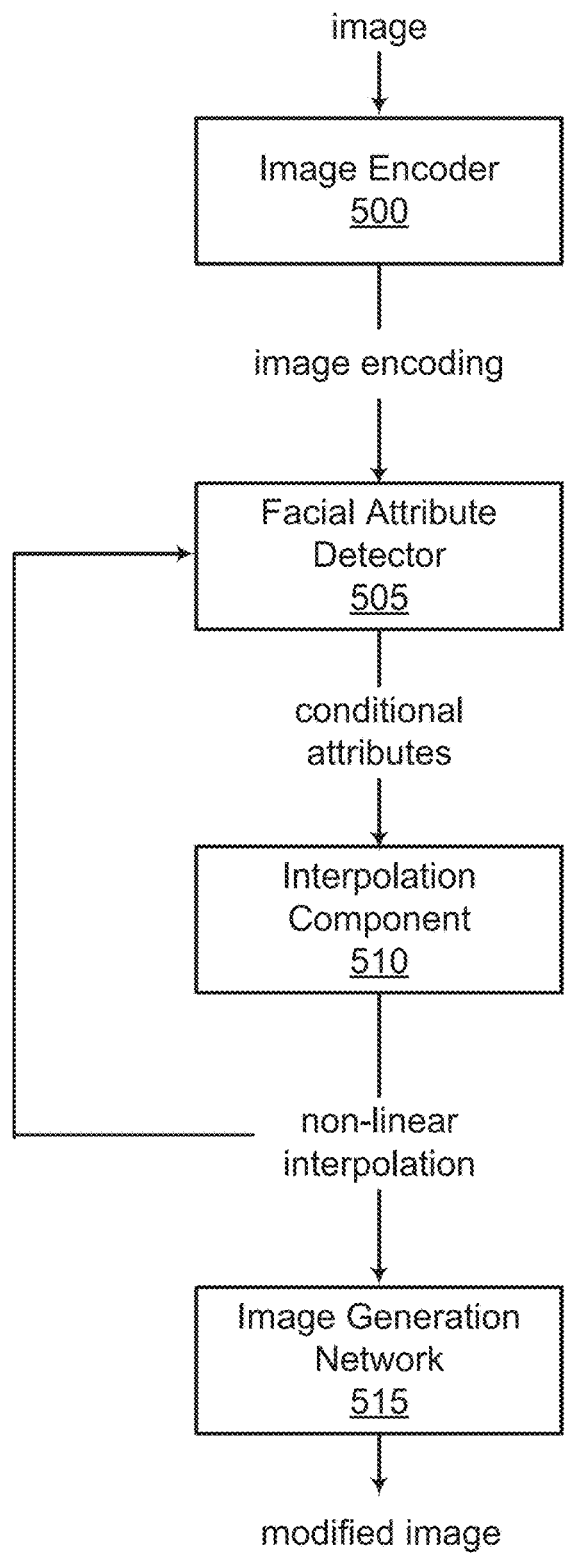
FIG. 5 shows an example of image editing diagram according to aspects of the present disclosure.

FIGS. 1 through 3 provide an example of aspects of the invention in the context of a face editing system. FIGS. 4 and 5 describe an example of an apparatus for editing an image. FIGS. 6 to 9 describe examples of methods and algorithms for performing non-linear interpolation to edit attributes of an image.

Facial Image Editing

FIG. 1 shows an example of a face editing system according to aspects of the present disclosure. The example shown includes user 100, user device 105, image editing apparatus 110, cloud 115, and database 120. According to the example shown in FIG. 1, a user provides a request to edit an attribute of an image of a face (e.g., "add eyeglasses to the face"). The image editing apparatus encodes the image, performs a non-linear interpolation process to adjust the image based on the request, and then provides the modified image back to the user 100.

In some examples, the user 100 communicates with the image editing apparatus 110 via a user device 105, which is connected to the image editing apparatus 110 via the cloud 115. In another embodiment, the user device 105 includes software that performs the functions of the image editing apparatus 110 locally. In some cases, the image is stored in the database 120. Metadata, including a vector representation of the image, can be stored in the database 120.

An attribute refers to a quality or feature of an image which is considered a characteristic of an object or person. For example, facial attributes may include age, expression, etc. In some cases, changes may be made to the one attribute (i.e., a primal attribute) of a face while maintaining other attributes (i.e., conditional attributes). constant. In some examples, new conditional attributes are selected at every step of an iterative process, resulting in a non-linear interpolation trajectory.

The face can be represented in a latent vector space, and after the sequence of modifications are made to the latent vector, a generative decoder network (e.g., a GAN) can generate a modified image based on the modified vector. Within the latent space, changes to the vector can result in changes to one or more attributes of the image. However, shifting the latent representation of an image in one direction can change multiple attributes, since in general the attributes are not represented by orthogonal vectors in the latent space. Therefore, a non-linear approach to modifying a latent vector can enable changes to be made to one attribute while preserving multiple other attributes.

GANs are generative models that may attain photo-realistic quality for image synthesis, particularly for well-constrained domains, for example, faces. However, there is lack of understanding related to mapping of a latent code sampled from a random distribution to the image space by GANs. Thus, use of GANs for controlled image generation and interpretable image editing is limited.

A latent subspace can be found that approximates boundaries (i.e., in the GAN latent space) corresponding to maintaining specific facial attributes constant (e.g., age, hairstyle, expression, etc.). Entangled attributes may be decoupled through linear subspace projection. An interpolation of the attribute is generated in the image space by navigating normal to the boundary of a certain attribute in the latent space. In some cases, the boundaries corresponding to the various semantic attributes may be represented as fixed planes in the latent space. Thus, the resulting interpolation is linear in nature. However, these planes are not orthogonal, so changing one attribute can impact other attributes in an undesirable way. Therefore, the image editing apparatus 110 modifies vector representations of images non-linearly in the latent space.

A user device 105 can be a personal computer, laptop computer, mainframe computer, palmtop computer, personal assistant, mobile device, or any other suitable processing apparatus. In some cases, the user device communicates with a server of the image editing apparatus 110 to perform edits to the image. In other embodiments, the changes are made by image editing software located on the user device.

According to some aspects, image editing apparatus 110 identifies an encoding of an image, an attribute to be modified in the image, and a set of attributes to be preserved in the image. Then the image editing apparatus 110 performs an iterative process to make a non-linear change to a vector representation of the image, and generates a modified image based on the modified vector representation. Image editing apparatus 110 is an example of, or includes aspects of, the corresponding element described with reference to FIG. 4.

According to some embodiments, image editing apparatus 110 can be implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

The database 120 is an organized collection of data, such as images and image metadata. For example, a database 120 can store data in a specified format known as a schema. A database 120 may be structured as a single database, a distributed database, multiple distributed databases, or an emergency backup database. In some cases, a database controller may manage data storage and processing in a database. In some cases, a user interacts with database controller. In other cases, database controller may operate automatically without user interaction.

In some examples, a data platform (i.e., Sensei) may be made available to customers for building machine learning models, where the customers may use a generative model (e.g., GAN) in the model zoo as a generic service. Thus, the boundary projection method may be used in an image interpolation or editing service (using GANs) which can be made available in the data platform.

FIG. 2 shows an example of editing a face according to aspects of the present disclosure. In some examples, these operations are performed by a system such as image editing apparatus 110, including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user inputs an image. For example, the user can select an image from a database, or load an image into an image editing software program. In some cases, the operations of this step refer to, or may be performed by, a user as described with reference to FIG. 1.

At operation 210, the user requests a change to an attribute of the image. For example, a user can select an image of a face and provide an editing request such as "add eyeglasses to the face." In one example, the user provides the editing request verbally. In another example, the editing request is made by selection of an option in an image editing menu. In some cases, the operations of this step refer to, or may be performed by, a user as described with reference to FIG. 1.

In some cases, a variation generator for website content management platform (e.g., Adobe® Experience Manager (AEM)) and style mixer for images can be used to generate attribute changes. Users may provide a set of images and expect a new set of generated images with mixed visual features adopted from the given images. For example, a creative designer of an apparel company may upload images about designs of dresses. In some cases, the designer may generate multiple variations of images using the set of uploaded images and a generative model.

At operation 215, the system edits the image based on the request. In some examples an image editing apparatus converts the image to a vector representation (i.e., a latent vector), and performs an iterative process to make a non-linear change to the vector representation. At each step of the iteration, new conditional attributes can be selected that are maintained during that step. These conditional attributes can be different at each step. The resulting image can include a modification to one attribute (i.e., adding glasses to the face) while preserving multiple other attributes (i.e., three or more other attributes). In some cases, the operations of this step refer to, or may be performed by, an image editing apparatus as described with reference to FIGS. 1 and 4.

Embodiments of the disclosure can be integrated with photo editing applications (e.g., Adobe® Photoshop, Adobe® Lightroom, Adobe® Photoshop Camera, etc.). The dynamic non-linear interpolation approach enables editing of images at a semantic level. In some cases, the semantic editing may include modifications such as altering the age, expression, pose of a person, changing the scaling, brightness, shifting an image, etc. In some examples, a neural filters feature is used which allows users to change or interpolate along various facial attributes, e.g., smile, hair, eyeglasses, age, etc. The dynamic non-linear algorithm outperforms existing algorithms in the number of interpolations generated.

At operation 220, the system presents the modified image to the user. In some examples, the system presents the modified image after making edits to the image automatically. That is, the user can provide a natural language editing request that specifies a result without specifying how to achieve the desired change. In some cases, the operations of this step refer to, or may be performed by, a user interface as described with reference to FIG. 4.

Accordingly, embodiments of the disclosure can be applied in multiple applications. For example, the approach may be used in Adobe® Photoshop for photo editing applications and neural filters. Additionally, non-linear interpolation may be used in a data platform (e.g., Sensei model zoo) or for data synthesis using GANs. Additionally or alternatively, embodiments of the disclosure may be used for inspiration and aiding the creative process of apparel designing for the next season. Additionally or alternatively, images with modified attributes can be used to communicate to creatives by including synthesized images that illustrate the requirements. Embodiments of the disclosure include a dynamic non-linear interpolation algorithm that generates improved image interpolations with changes in the desired attributes. For example, the interpolation approach may be used to generate semantically similar images for a set of given images, which may increase the performance of content management services.

FIG. 3 shows an example of changing a face attribute according to aspects of the present disclosure. The example shown includes original image 300 and modified images 305. The modified images 305 show how the age of a face can be changed to various degrees while retaining other attributes constant. Each of the modified images 305 can represent an intermediate step of a non-linear interpolation process.

An image processing apparatus such as the image editing apparatus 110 of FIG. 1 can use a GAN to generate an image of the face of a person. The original image 300 can either be an actual photograph, a generated image, or another image of a face. In some examples, the GAN latent space is navigated to interpolate along the age attribute (i.e., the primal attribute) of the face while maintaining other attributes, for example, hairstyle, expression (i.e., conditional attributes) are kept constant. In some cases, for each of the attributes (i.e., age, expression, etc.), the corresponding boundaries in the GAN latent space are calculated. In some cases, manipulation of the primal attribute may be done (i.e., keeping conditional attributes constant) by projecting the primal boundary such that the primal boundary is orthogonal to the boundary of conditional attributes. However, in some cases, the boundary planes are not all orthogonal, so linear interpolation along a single boundary vector can change multiple attributes.

In FIG. 3, the conditional attributes of the original image 300 are unchanged while interpolating the primal attribute of age to obtain the modified images 305. In the example, the age of the face is manipulated while keeping expression, and other attributes constant.

Architecture

In FIGS. 4 and 5, an apparatus for image processing is described. One or more embodiments of the apparatus include a facial attribute detector configured to generate attribute values of an image based on an encoding of the image; an interpolation component configured to iteratively generate a boundary vector for modifying the encoding of the image based on a plurality of conditional boundary vectors representing attributes to be preserved in the image; and an image generation network configured to generate a modified image based on the encoding of the image and the iteratively generated boundary vectors.

In some aspects, the attributes to be preserved in the image are dynamically selected at each iteration by comparing the attribute values of the image to attribute values of a candidate image corresponding to the boundary vector. In some aspects, the interpolation component is configured to identify a number of iterations greater than one and determine a step size based on the number of iterations, wherein a magnitude of a change to the encoding of the image based on the boundary vector is based on the step size.

In some aspects, the image generation network comprises a generative adversarial network (GAN). In some aspects, the facial attribute detector comprises a convolutional neural network (CNN).

FIG. 4 shows an example of an image editing apparatus 400 according to aspects of the present disclosure. Image editing apparatus 400 is an example of, or includes aspects of, the corresponding element described with reference to FIG. 1. In one aspect, image editing apparatus 400 may be a computer system that includes processor unit 405, memory unit 410, I/O controller 415, image encoder 420, facial attribute detector 425, interpolation component 430, image generation network 435, and user interface 440.

The processor unit 405 can be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 405 is configured to operate a memory array using a memory controller. In other cases, a memory controller is integrated into the processor unit 405. In some cases, the processor unit 405 is configured to execute computer-readable instructions stored in a memory to perform various functions.

Examples of a memory unit 410 include random access memory (RAM), read-only memory (ROM), or a hard disk. Examples of memory unit 410 include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

An I/O controller 415 may manage input and output signals for a device. I/O controller 415 may also manage peripherals not integrated into a device. In some cases, an I/O controller 415 may represent a physical connection or port to an external peripheral. In some cases, an I/O controller 415 may utilize an operating system such as iOS®, ANDROID®, MS-DOS®, MS-WINDOWS®, OS/2®, UNIX®, LINUX®, or another known operating system. In other cases, an I/O controller 415 may represent or interact with a modem, a keyboard, a mouse, a touchscreen, or a similar device. In some cases, an I/O controller 415 may be implemented as part of a processor. In some cases, a user may interact with a device via I/O controller 415 or via hardware components controlled by an I/O controller 415.

In some examples, the image encoder 420, facial attribute detector 425, and image generation network 435 can be implemented as an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, image encoder 420 generates an encoding of a candidate image corresponding to each boundary vector of the sequence of boundary vectors. Image encoder 420 is an example of, or includes aspects of, the corresponding element described with reference to FIG. 5.

According to some aspects, facial attribute detector 425 computes an attribute difference between the encoding of the image and the encoding of the candidate image for each of the set of attributes. According to some aspects, facial attribute detector 425 is configured to generate attribute values of an image based on an encoding of the image. In some aspects, the facial attribute detector 425 includes a CNN. Facial attribute detector 425 is an example of, or includes aspects of, the corresponding element described with reference to FIG. 5.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, interpolation component 430 generates a non-linear interpolation for the encoding by iteratively identifying a sequence of boundary vectors, where each boundary vector of the sequence of boundary vectors is based on selecting a set of conditional boundary vectors representing a subset of the set of attributes to be preserved at each corresponding iteration. In some examples, interpolation component 430 identifies a number of iterations greater than one. In some examples, interpolation component 430 determines a step size based on the number of iterations, where a magnitude of iterative changes to the encoding of the image is based on the step size. In some examples, interpolation component 430 sorts the set of attributes based on the attribute difference, where the set of conditional boundary vectors is selected based on the sorting. In some aspects, a number of the set of attributes to be preserved in the image is greater than two. In some aspects, a number of the set of conditional boundary vectors selected at each corresponding iteration is equal to two. In some aspects, the set of conditional boundary vectors is different for each corresponding iteration.

According to some aspects, interpolation component 430 generates a first boundary vector based on a first primal boundary vector representing the attribute to be modified in the image and a set of first conditional boundary vectors representing first attributes to be preserved in the image. In some examples, interpolation component 430 updates an encoding of the image based on the first boundary vector to obtain a first modified encoding. In some examples, interpolation component 430 generates a second boundary vector based on the first boundary vector and a set of second conditional boundary vectors representing second attributes to be preserved in the image, where the second attributes are different from the first attributes.

In some examples, interpolation component 430 updates the first modified encoding based on the second boundary vector to obtain a second modified encoding. In some examples, interpolation component 430 identifies a number of iterations greater than one and determines a step size based on the number of iterations. In some cases, a magnitude of the first boundary vector and a magnitude of changes to the encoding of the image is based on the step size.

In some examples, interpolation component 430 iteratively updates the encoding of the image for a set of iterations corresponding to the number of iterations based on an iteration-specific subset of the set of attributes to be preserved in the image. In some examples, interpolation component 430 generates an encoding of a candidate image corresponding to the first boundary vector (e.g., to determine which attributes are changing the most). In some examples, interpolation component 430 sorts the set of attributes based on the attribute difference, where the first attributes are selected based on the sorted set of attributes. In some aspects, the first attributes and the second attributes share at least one common attribute.

According to some aspects, interpolation component 430 is configured to iteratively generate a boundary vector for modifying the encoding of the image based on a plurality of conditional boundary vectors representing attributes to be preserved in the image. In some aspects, the attributes to be preserved in the image are dynamically selected at each iteration by comparing the attribute values of the image to attribute values of a candidate image corresponding to the boundary vector. In some aspects, the interpolation component 430 is configured to identify a number of iterations greater than one and determine a step size based on the number of iterations, where a magnitude of a change to the encoding of the image based on the boundary vector is based on the step size. Interpolation component 430 is an example of, or includes aspects of, the corresponding element described with reference to FIG. 5.

According to some aspects, image generation network 435 generates a modified image based on the image encoding and the non-linear interpolation, where the modified image corresponds to the image with the attribute to be modified. In some examples, image generation network 435 generates a set of intermediate images corresponding to different values of the attribute to be modified in the image. According to some aspects, image generation network 435 is configured to generate a modified image based on iteratively generated boundary vectors. In some aspects, the image generation network 435 includes a GAN. Image generation network 435 is an example of, or includes aspects of, the corresponding element described with reference to FIG. 5.

A GAN is a category of ANN where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest (e.g., images of faces), while the discriminator network distinguishes candidates produced by the generator from the true data distribution. The generator network's training objective is to increase the error rate of the discriminator network (i.e., to produce novel candidates that the discriminator network classifies as real).

In one example, InterfaceGAN (i.e., Interpreting Face GANs) can be used as a generator network. InterfaceGAN is a framework that finds interpretable semantics encoded in the latent space of face synthesis GAN models and utilizes the semantics for face editing. In some cases, InterfaceGAN may be used to discover directions in the latent space to smoothly vary binary facial attributes, for example, age, expression, eyeglasses, etc. In one implementation, InterfaceGAN has been used to randomly generate 500K images. A facial attribute detector (e.g., ResNet50) predicts the value of binary facial attributes for the generated images. The list of 500K images is sorted for the binary attributes based on the predicted value of the attribute and the top 10K and bottom 10K images are collected. 14K images are randomly sampled from the 20K collected images and used as training set. A support vector machine (SVM) model is trained for each attribute using the 14K images to predict the value of the attribute (i.e., 0 or 1) given the latent code used to generate the image. The trained SVM represents a hyperplane that serves as a boundary in the latent space separating two classes of a binary attribute.

According to some aspects, user interface 440 receives an editing command, where the attribute to be modified in the image is identified based on the editing command. In some examples, user interface 440 provides a set of attribute sliders in a graphical user interface (GUI), where the set of sliders correspond to the attribute to be modified in the image and the set of attributes to be preserved in the image, and where the editing command is based on a user interaction with an attribute slider corresponding to the attribute to be modified in the image.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 5 shows an example of image editing diagram according to aspects of the present disclosure. The example shown includes image encoder 500, facial attribute detector 505, interpolation component 510, and image generation network 515. According to some embodiments, an image is encoded by image encoder 500 to produce an image encoding (i.e., a vector in a latent space representing possible images that can be generated).

As an example illustrated in FIG. 5, the image encoder 500 receives an image and outputs a set of image features (i.e., the image encoding). In some examples, the image encoding is embedded in a latent space of a GAN, so that an image can be generated from it. The facial attribute detector 505 can detect the attributes of the image (or an encoding of the image) at each step of an iterative process. At each step, the facial attribute detector 505 detects which attributes to select as conditional attributes to be preserved at that step. For example, the attributes can be detected according to sub-procedure 1 described with reference to FIG. 8, and the conditional attributes can be selected according to the sub-procedure 2 described with reference to FIG. 8.

Once the conditional attributes are selected, non-linear interpolation vector can be generated that modifies the image according to the primal attribute, but preserves the conditional attributes. This process can be repeated a set number of times, or until the primal attribute has been modified according to an edit request. If the number of iterations is set, the magnitude of the non-linear interpolation vector can be selected to achieve the desired change after that number of steps.

In one example, a boundary vector for the primal attribute or a conditional attribute can be represented by the corresponding normal vector of a boundary plane (denoted using b). The primal boundary may be represented using $b_0$ and two other selected attribute boundaries may be represented using $b_1$ and $b_2$. A new projected boundary $b_{new}$ may be of the form $b_{new}=b_0-x_1*b_1-x_2*b_2$. The scalar values $x_1$ and $x_2$ can be computed by solving $(b_{new})^T \cdot b_1 = 0$ and $(b_{new})^T \cdot b_2 = 0$. Solving these equations yields the values for $x_1$ and $x_2$, which can be substituted in the original equation to obtain the projected boundary $b_{new}$. This process can be repeated at each step to produce a non-linear result.

Once the iterative process is complete, a final non-linear interpolation vector can be used to generate a modified image having the desired primal attribute. For example, the modified image can be generated by the image generation network 515 (e.g., a GAN).

Image encoder 500, facial attribute detector 505, interpolation component 510, and image generation network 515 are examples of, or includes aspects of, the corresponding elements described with reference to FIG. 4.

Non-Linear Interpolation

In FIGS. 6 through 9, a method for image processing is described. One or more embodiments of the method include identifying an encoding of an image, an attribute to be modified in the image, and a plurality of attributes to be preserved in the image; generating a non-linear interpolation for the encoding by iteratively identifying a sequence of boundary vectors, wherein each boundary vector of the sequence of boundary vectors is based on selecting a plurality of conditional boundary vectors representing a subset of the plurality of attributes to be preserved at each corresponding iteration; and generating a modified image based on the image encoding and the non-linear interpolation, wherein the modified image corresponds to the image with the attribute to be modified.

Some examples of the method, apparatus, non-transitory computer readable medium, and system further include identifying a number of iterations greater than one. Some examples further include determining a step size based on the number of iterations, wherein a magnitude of iterative changes to the encoding of the image is based on the step size.

Some examples of the method, apparatus, non-transitory computer readable medium, and system further include generating an encoding of a candidate image corresponding to each boundary vector of the sequence of boundary vectors. Some examples further include computing an attribute difference between the encoding of the image and the encoding of the candidate image for each of the plurality of attributes. Some examples further include sorting the plurality of attributes based on the attribute difference, wherein the plurality of conditional boundary vectors is selected based on the sorting.

Some examples of the method, apparatus, non-transitory computer readable medium, and system further include receiving an editing command, wherein the attribute to be modified in the image is identified based on the editing command. Some examples of the method, apparatus, non-transitory computer readable medium, and system further include providing a plurality of attribute sliders in a GUI, wherein the plurality of sliders correspond to the attribute to be modified in the image and the plurality of attributes to be preserved in the image, and wherein the editing command is based on a user interaction with an attribute slider corresponding to the attribute to be modified in the image.

Some examples of the method, apparatus, non-transitory computer readable medium, and system further include generating a plurality of intermediate images corresponding to different values of the attribute to be modified in the image. In some aspects, a number of the plurality of attributes to be preserved in the image is greater than two. In some aspects, a number of the plurality of conditional boundary vectors selected at each corresponding iteration is equal to two. In some aspects, the plurality of conditional boundary vectors is different for each corresponding iteration.

Additionally or alternatively, another method for image processing is described. One or more embodiments of the method include identifying an encoding of an image, an attribute to be modified in the image, and a plurality of attributes to be preserved in the image; generating a first boundary vector based on a first primal boundary vector representing the attribute to be modified in the image and a plurality of first conditional boundary vectors representing first attributes to be preserved in the image; updating the encoding of the image based on the first boundary vector to obtain a first modified encoding; generating a second boundary vector based on the first boundary vector and a plurality of second conditional boundary vectors representing second attributes to be preserved in the image, wherein the second attributes are different from the first attributes; updating the first modified encoding based on the second boundary vector to obtain a second modified encoding; and generating a modified image based on the second modified encoding, wherein the modified image corresponds to the image with the attribute to be modified.

Some examples of the method, apparatus, non-transitory computer readable medium, and system further include identifying a number of iterations greater than one. Some examples further include determining a step size based on the number of iterations, wherein a magnitude of the first boundary vector and a magnitude of changes to the encoding of the image is based on the step size. Some examples of the method, apparatus, non-transitory computer readable medium, and system further include iteratively updating the encoding of the image for a plurality of iterations corresponding to the number of iterations based on an iteration-specific subset of the plurality of attributes to be preserved in the image.

Some examples of the method, apparatus, non-transitory computer readable medium, and system further include generating an encoding of a candidate image corresponding to the first boundary vector. Some examples further include computing an attribute difference between the encoding of the image and the encoding of the candidate image for each of the plurality of attributes. Some examples further include sorting the plurality of attributes based on the attribute difference, wherein the first attributes are selected based on the sorted plurality of attributes.

Some examples of the method, apparatus, non-transitory computer readable medium, and system further include receiving an editing command via, wherein the attribute to be modified in the image is identified based on the editing command. In some aspects, the first attributes and the second attributes share at least one common attribute.

Figure 6:
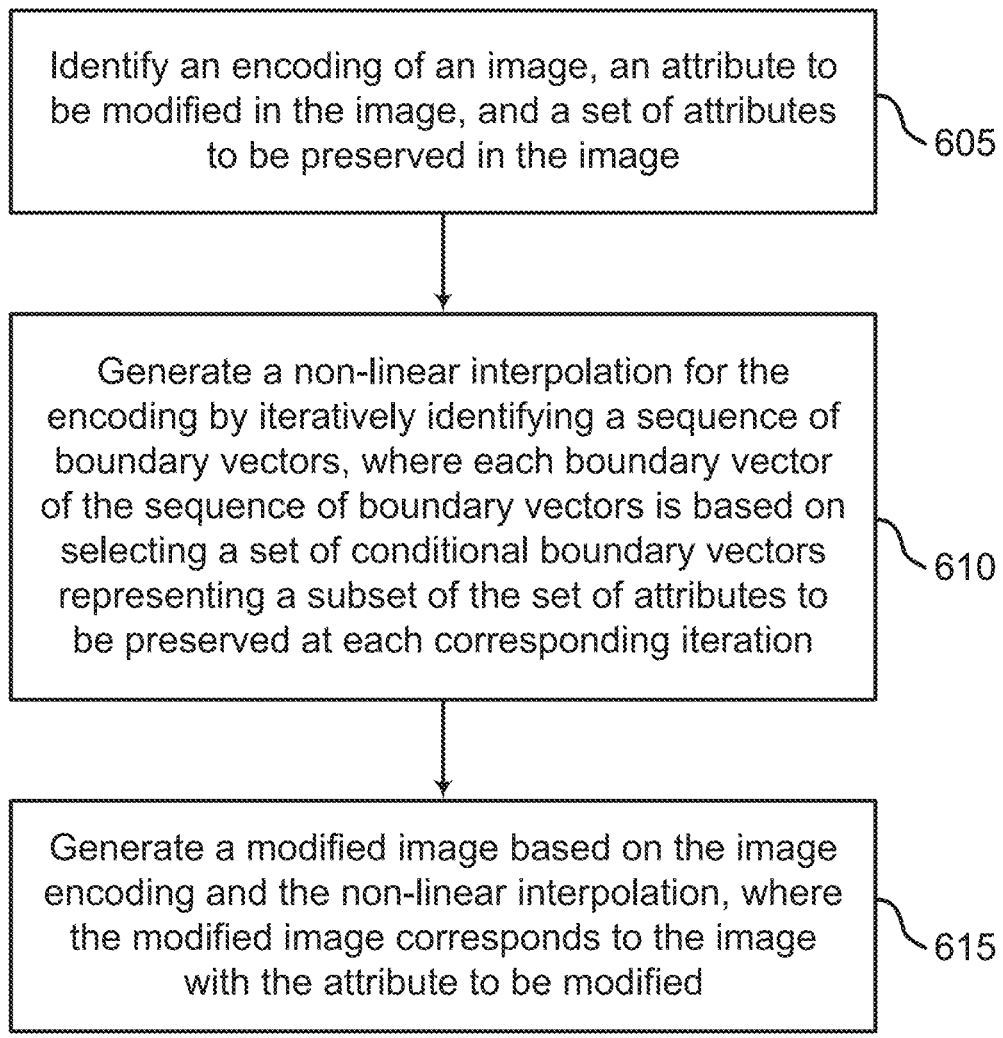
FIG. 6 shows an example of image processing according to aspects of the present disclosure.

FIG. 6 shows an example of image processing according to aspects of the present disclosure. The method described in FIG. 6 can be used to enable a user to automatically edit one attribute of an image while preserving other attributes of the image.

In some examples, these operations are performed by a system including a processor executing a set of codes to control functional elements of an apparatus (e.g., the image editing apparatus 110 described with reference to FIG. 4-5). Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user identifies an image, an attribute to be modified in the image, and a set of attributes to be preserved in the image. For example, the user may select an image of a face and indicated that the age of the face is to be increased. In some examples, the attribute to be modified is indicated using a natural language edit request. The image may be encoded using an image encoder (e.g., a convolutional neural network). The attribute to be modified may be referred to as the primary attribute, and the attributes to be preserved can be referred to as the conditional attributes. In some cases, the operations of this step refer to, or may be performed by, an image editing apparatus as described with reference to FIGS. 1 and 4.

At operation 610, the system generates a non-linear interpolation for the encoding by iteratively identifying a sequence of boundary vectors, where each boundary vector of the sequence of boundary vectors is based on selecting a set of conditional boundary vectors representing a subset of the set of attributes to be preserved at each corresponding iteration. For example, boundary vectors may be selected at each step of the iteration by quantifying which of the conditional attributes have been changed the most (i.e., to prevent them from being modified further). Further detail regarding an example of the non-linear interpolation process is provided with reference to the algorithm in FIG. 8. In some cases, the operations of this step refer to, or may be performed by, an interpolation component as described with reference to FIGS. 4 and 5.

At operation 615, the system generates a modified image based on the image encoding and the non-linear interpolation, where the modified image corresponds to the image with the attribute to be modified. In some cases, the image may be generated using a GAN based on a vector in a latent space. The operations of this step refer to, or may be performed by, an image generation network as described with reference to FIGS. 4 and 5.

Figure 7:
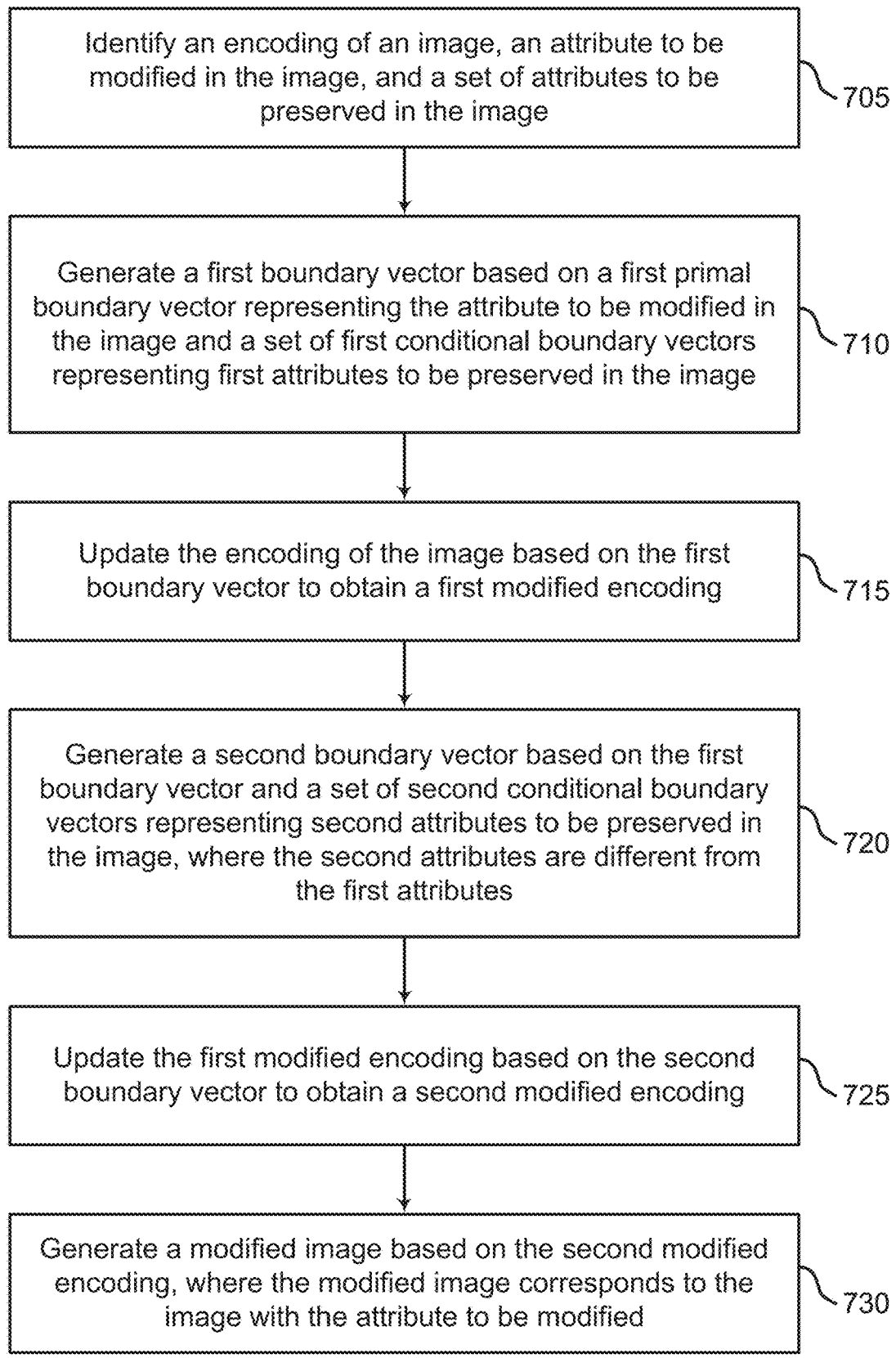
FIG. 7 shows an example of image processing using iteratively selected boundary vectors according to aspects of the present disclosure.

FIG. 7 shows an example of image processing using iteratively selected boundary vectors according to aspects of the present disclosure. The process described with reference to FIG. 7 represents two iterations of an iterative process, and illustrates how potentially different boundary vectors are selected at each step based on the results of the last step.

In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system identifies an encoding of an image, an attribute to be modified in the image, and a set of attributes to be preserved in the image. In some cases, the operations of this step refer to, or may be performed by, an image editing apparatus as described with reference to FIGS. 1 and 4.

At operation 710, the system generates a first boundary vector based on a first primal boundary vector representing the attribute to be modified in the image and a set of first conditional boundary vectors representing first attributes to be preserved in the image. The first boundary vector can be generated according to the process described with reference to the FIG. 8. In some cases, the operations of this step refer to, or may be performed by, an interpolation component as described with reference to FIGS. 4 and 5.

At operation 715, the system updates the encoding of the image based on the first boundary vector to obtain a first modified encoding. In some cases, the operations of this step refer to, or may be performed by, an interpolation component as described with reference to FIGS. 4 and 5.

At operation 720, the system generates a second boundary vector based on the first boundary vector and a set of second conditional boundary vectors representing second attributes to be preserved in the image, where the second attributes are different from the first attributes. Thus, different boundary vectors can be selected at each stage of an iterative process (i.e., the first boundary vector need not be the same as, or parallel to the second boundary vector). In some cases, the operations of this step refer to, or may be performed by, an interpolation component as described with reference to FIGS. 4 and 5.

At operation 725, the system updates the first modified encoding based on the second boundary vector to obtain a second modified encoding. In some cases, the operations of this step refer to, or may be performed by, an interpolation component as described with reference to FIGS. 4 and 5.

At operation 730, the system generates a modified image based on the second modified encoding, where the modified image corresponds to the image with the attribute to be modified. In some cases, the operations of this step refer to, or may be performed by, an image generation network as described with reference to FIGS. 4 and 5.

FIG. 8 shows an example of dynamic non-linear interpolation algorithm 800 according to aspects of the present disclosure.

The algorithm of FIG. 8 shows an example of a dynamic non-linear interpolation function. This function takes G, z, $b_0$, $[b_1, b_2, \ldots, b_N]$, $\Delta$, n, and F as input. For example, the input includes a generator network G, a latent code z, a primal boundary $b_0$, N conditional boundaries $[b_1, b_2, \ldots, b_N]$, step size of the interpolation $\Delta$, number of steps in the interpolation n, and a facial attribute network F. A sub-procedure 1 computes the scores of the N conditional attributes for an image img using network F. At line 1 of sub-procedure 1, a function predict_attributes with inputs F and img is called. For example, the algorithm retrieves product attributes based on an image img and a network F. At line 2, the function returns the value of the network for a given image, F(img). Additionally, a sub-procedure 2 identifies and returns two conditional attributes with maximum change in scores between previous and current steps of interpolation. At line 1 of sub-procedure 2, a function get_max_diff_conditional_attributes is called that uses $attribute_{predictions}$ as input. For example, the algorithm uses the function to select two attributes that change most. At line 2, $prev_{predictions}$ is set equal to $attribute_{predictions}[-2]$, which indicates second last element of list of attribute predictions. At line 3, $curr_{predictions}$ is set equal to $attribute_{predictions}[-1]$, which indicates last element of list of attribute predictions. At line 4 of sub-procedure 2, the difference of predictions, $diff_{predictions}$ is defined as an array. At line 5, for i in range (1, N), line 6 is executed. At line 6, a function $diff_{predictions}$. append with input (i, abs($prev_{predictions}[i] - curr_{predictions}[i]$))

is called which adds the inputs to the array of diff$_{predictions}$. The algorithm generates the difference of predictions by computing the difference between the previous and current predictions and providing the corresponding absolute value. At line 7, the function diff$_{predictions}$. sort is called with input key=lambda x:x[1], reverse=True. In some cases, the algorithm sorts the difference in prediction using a variable key and arranges the predictions in descending order. At line 8, the algorithm returns the value of the prediction differences using appropriate values from the matrix (i.e., diff$_{predictions}$ [0] [0] and diff$_{predictions}$[1] [0]).

The next fifteen lines describe the procedure of the algorithm. At line 1, original$_{img}$ is set equal to G(z). At line 2, an array interpolation$_{list}$ is created of the size of original$_{img}$. At line 3, an array attribute$_{predictions}$ is created of the size of predicted attributes (i.e., using function predict_attributes) with input network F and original$_{img}$. At line 4, b is set equal to $b_0$. At line 5, for step in range (1, n), lines 6-14 are executed. At line 6, img is set equal to G(z+Δ*b). At line 7, a function attribute$_{predictions}$. append is called with input predict_attributes (F, img) that adds values of the predicted attributes based on a network F and image img. At line 8, the value of the function get_max_diff_conditional_attributes with input attribute$_{predictions}$ is assigned to variables (i,j) which indicates that (i,j) are the two attributes with maximum change at the current step. At line 9, the value of attribute$_{predictions}$.pop( ) is returned which is the top element from the stack of values of predicted attributes. At line 10, b is set equal to project_boundary(b, [$b_i$, $b_j$]) which represents the projected boundary using primal and conditional boundaries. At line 11, z is set equal to z+Δ*b. At line 12, img is set equal to G(z). At line 13, the value of the function interpolation$_{list}$. append with an image img is called. At line 14, the value of attribute$_{predictions}$. append with an input value of predict_attributes(F, img) is called. At line 15, the algorithm returns the value of interpolation$_{list}$.

Figure 9:
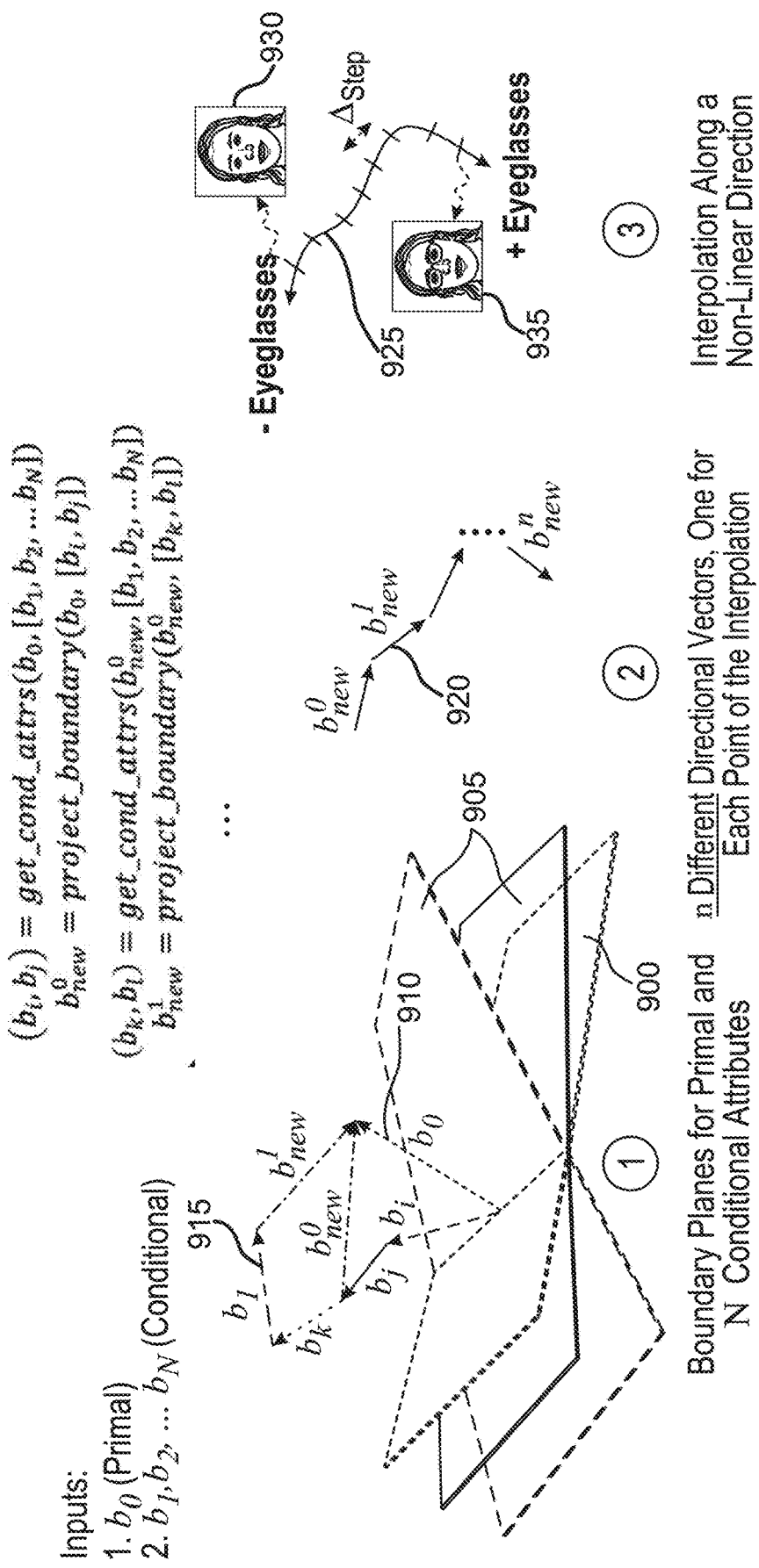
FIG. 9 shows an example of dynamic non-linear interpolation diagram according to aspects of the present disclosure.

FIG. 9 shows an example of dynamic non-linear interpolation diagram according to aspects of the present disclosure. The example shown includes primal boundary plane 900, conditional boundary planes 905, primal boundary vector 910, conditional boundary vectors 915, resulting boundary vector 920, iterative boundary vectors 925, original image features 930, and interpolated image features 935.

Embodiments of the present disclosure include an interpolation algorithm that navigates non-linearly in the latent space for advanced interpolation results. The algorithm accepts as input the primal attribute to be changed and conditional attributes to be maintained. At each step of a multi-step iteration, a primal boundary plane 900 is computed for the primal attribute, and conditional boundary planes 905 are computed for the conditional attributes. Next, primal boundary vector 910 ($b_0$) and conditional boundary vectors 915 ($b_1, b_2, \ldots, b_N$) are computed based on the boundary planes. A facial attribute detector network F can be used to detect attributes of the image. Given an image, the facial attribute detector network outputs the corresponding conditional attribute scores. The facial attribute detector network F is used to compute the resulting boundary vector 920 dynamically at each point of the interpolation, thus providing non-linear navigation in the latent space.

The dynamic non-linear interpolation algorithm may be described by denoting the step size of the interpolation as Δ. The latent vector and iterative boundary vectors 925 used at the $t^{th}$ step of the interpolation are denoted as $z_t$ and $b_{new}^t$ respectively. The interpolated image features 935 generated at the $t^{th}$ step can be given as: $img_t = G(z_t + \Delta * b_{new}^t)$. The next image in the interpolation may be computed by updating the latent vector to $z_{t+1} = z_t + \Delta * b_{new}^t$.

A candidate image is generated for the interpolation at $(t+1)^{th}$ step as: candidate_img$_{t+1}$=G($z_{t+1}$+Δ*$b_{new}^t$). Next, the facial attribute detector network F is used to compare the images img$_t$ and candidate_img$_{t+1}$ to find two conditional attributes i and j that have maximum absolute difference in the scores between the two images. As a result, the boundary vector $b_{new}^t$ is projected such that the vector is orthogonal to $b_i$ and $b_j$, thus obtaining a new boundary vector $b_{new}^{t+1}$. The image at the $(t+1)^{th}$ step is generated as: $img_{t+1}$=G($z_{t+1}$+Δ*$b_{new}^{t+1}$). Similarly, the latent and boundary vectors may be updated at each step to obtain the entire sequence of images.

Accordingly, a dynamic non-linear interpolation approach dynamically computes the boundary vector at each step of the interpolation. In some cases, feedback from the facial attribute detector is used to identify appropriate navigation direction in the latent space at each step resulting in an image interpolation that preserves conditional attributes. As a result, dynamic non-linear interpolation significantly outperforms linear interpolation algorithm, which can preserve a maximum of two conditional attributes.

In some examples, the primal boundary and N conditional boundaries are provided as input. A facial attribute detector is used at each step of the interpolation to compute top conditional attributes. In some cases, the top conditional attributes refer to the attributes that undergo maximum change (i.e., with reference to the previous step) on account of using the previous boundary vector. Next, the boundary vector is updated at the current step. As a result, different boundary vectors are obtained at each step of the interpolation $b_{new}^0, b_{new}^1 \ldots$ to $b_{new}^n$, thus producing a non-linear interpolation trajectory.

Accordingly, the present disclosure describes techniques for generating image interpolations incrementally by navigating in the latent space. In some cases, the navigation is performed by computing the boundary direction vector dynamically at each step, based on the previous history of generated images (i.e., one step at a time and not one-time generation). As a result, the nature of directions along which navigation is performed in latent space is dynamic which gives a non-linear interpolation path.

Embodiments of the present disclosure include a technique for computing conditional decision boundaries based on attributes of the generated images. In some examples, the attributes are selected using a strategy at every step of the interpolation, resulting in a non-linear interpolation trajectory. For example, the non-linear interpolation approach may be applied in multiple image editing products such as Adobe® Photoshop, Adobe® Lightroom, etc. Embodiments of the disclosure include a dynamic non-linear interpolation algorithm which outperforms linear interpolation technique.

Linear interpolation can be compared with a non-linear interpolation approach. Qualitative examples of interpolation along multiple facial attributes like age, expression, eyeglasses, etc. using the non-linear approach show that non-linear interpolation can provide improved results compared to conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
identifying an encoding of an image, an attribute to be modified in the image, and a plurality of attributes to be preserved in the image;
identifying a number of iterations greater than one;
determining a step size based on the number of iterations;
generating a non-linear interpolation for the encoding by iteratively identifying a sequence of boundary vectors, wherein each boundary vector of the sequence of boundary vectors is based on selecting a plurality of conditional boundary vectors representing a subset of the plurality of attributes to be preserved at each corresponding iteration, and wherein a magnitude of iterative changes to the encoding of the image is based on the step size; and
generating a modified image based on the encoding of the image and the non-linear interpolation, wherein the modified image corresponds to the image with the attribute to be modified.

2. The method of claim 1, further comprising:
generating an encoding of a candidate image corresponding to each boundary vector of the sequence of boundary vectors;
computing an attribute difference between the encoding of the image and the encoding of the candidate image for each of the plurality of attributes; and
sorting the plurality of attributes based on the attribute difference, wherein the plurality of conditional boundary vectors is selected based on the sorting.

3. The method of claim 1, further comprising:
receiving an editing command, wherein the attribute to be modified in the image is identified based on the editing command.

4. The method of claim 3, further comprising:
providing a plurality of attribute sliders in a GUI, wherein the plurality of attribute sliders correspond to the attribute to be modified in the image and the plurality of attributes to be preserved in the image, and wherein the editing command is based on a user interaction with an attribute slider corresponding to the attribute to be modified in the image.

5. The method of claim 1, further comprising:
generating a plurality of intermediate images corresponding to different values of the attribute to be modified in the image.

6. The method of claim 1, wherein:
a number of the plurality of attributes to be preserved in the image is greater than two.

7. The method of claim 1, wherein:
a number of the plurality of conditional boundary vectors selected at each corresponding iteration is equal to two.

8. The method of claim 1, wherein:
the plurality of conditional boundary vectors is different for each corresponding iteration.

9. An apparatus comprising:
at least one processor; and
at least one memory including instructions executable by the at least one processor to:
identify an encoding of an image, an attribute to be modified in the image, and a plurality of attributes to be preserved in the image;
identify a number of iterations greater than one;
determine a step size based on the number of iterations;
generate a non-linear interpolation for the encoding by iteratively identifying a sequence of boundary vectors, wherein each boundary vector of the sequence of boundary vectors is based on selecting a plurality of conditional boundary vectors representing a subset of the plurality of attributes to be preserved at each corresponding iteration, and wherein a magnitude of iterative changes to the encoding of the image is based on the step size; and
generate a modified image based on the encoding of the image and the non-linear interpolation, wherein the modified image corresponds to the image with the attribute to be modified.

10. The apparatus of claim 9, further comprising instructions executable by the at least one processor to:
generate an encoding of a candidate image corresponding to each boundary vector of the sequence of boundary vectors;
compute an attribute difference between the encoding of the image and the encoding of the candidate image for each of the plurality of attributes; and
sort the plurality of attributes based on the attribute difference, wherein the plurality of conditional boundary vectors is selected based on the sorting.

11. The apparatus of claim 9, further comprising instructions executable by the at least one processor to:
receive an editing command, wherein the attribute to be modified in the image is identified based on the editing command.

12. The apparatus of claim 11, further comprising instructions executable by the at least one processor to:
provide a plurality of attribute sliders in a GUI, wherein the plurality of attribute sliders correspond to the attribute to be modified in the image and the plurality of attributes to be preserved in the image, and wherein the editing command is based on a user interaction with an attribute slider corresponding to the attribute to be modified in the image.

13. The apparatus of claim 9, further comprising instructions executable by the at least one processor to:
generate a plurality of intermediate images corresponding to different values of the attribute to be modified in the image.

14. A non-transitory computer readable medium storing code for image processing, the code comprising instructions executable by at least one processor to:
identify an encoding of an image, an attribute to be modified in the image, and a plurality of attributes to be preserved in the image;
identify a number of iterations greater than one;
determine a step size based on the number of iterations;

generate a non-linear interpolation for the encoding by iteratively identifying a sequence of boundary vectors, wherein each boundary vector of the sequence of boundary vectors is based on selecting a plurality of conditional boundary vectors representing a subset of the plurality of attributes to be preserved at each corresponding iteration, and wherein a magnitude of iterative changes to the encoding of the image is based on the step size; and generate a modified image based on the encoding of the image and the non-linear interpolation, wherein the modified image corresponds to the image with the attribute to be modified.

15. The non-transitory computer readable medium of claim 14, the code further comprising instructions executable by the at least one processor to:

generate an encoding of a candidate image corresponding to each boundary vector of the sequence of boundary vectors;

compute an attribute difference between the encoding of the image and the encoding of the candidate image for each of the plurality of attributes; and sort the plurality of attributes based on the attribute difference, wherein the plurality of conditional boundary vectors is selected based on the sorting.

16. The non-transitory computer readable medium of claim 14, the code further comprising instructions executable by the at least one processor to:

receive an editing command, wherein the attribute to be modified in the image is identified based on the editing command; and provide a plurality of attribute sliders in a GUI, wherein the plurality of attribute sliders correspond to the attribute to be modified in the image and the plurality of attributes to be preserved in the image, and wherein the editing command is based on a user interaction with an attribute slider corresponding to the attribute to be modified in the image.

17. The non-transitory computer readable medium of claim 14, the code further comprising instructions executable by the at least one processor to:

generate a plurality of intermediate images corresponding to different values of the attribute to be modified in the image.

* * * * *